Patented Aug. 11, 1942

2,292,645

UNITED STATES PATENT OFFICE 2,292,645

EYEBROW DRESSING

Rebecca T. Markin, Chicago, Ill.

No Drawing. Application December 2, 1940,
Serial No. 368,231

3 Claims. (Cl. 167—85)

This invention relates to a composition of matter adapted for use as an eyebrow dressing, and to the method of preparing the product.

The main object of the invention is to produce an eyebrow dressing which is free from dye, coloring matter, irritating or other harmful substances, and which enhances the natural color of the brows and imparts to them a well groomed appearance.

When applied to the brows by a small brush, the dressing serves to shape the brows and to hold each hair in its arranged position, but without making the hair appear stiff or artificial.

Another object of the invention is to produce a composition of the character described which is not sticky and is easy to apply.

Preferably I use the following mentioned ingredients in the proportions stated, although said proportions may be varied to a limited extent without departing from the scope of my invention:

| | Parts by weight. |
|---|---|
| Green surgical soap | 100 |
| Beeswax | 48 |
| Water | 49 |
| Borax | 3 |

The soap is melted in a double boiler or steam jacketed kettle and half of the water is added to the melted soap. The borax is dissolved in the balance of the water which is then heated to approximately 140° F. The beeswax is also melted by heating. The water and borax solution is added to the water and melted soap, the temperature being maintained at 140° F. or somewhat above 140° F. Then the melted beeswax is added while rapidly stirring the mixture. Preferably, vigorous stirring is continued for some time after the mixture has cooled. This whitens the color of the product.

The finished product is smooth, plastic, easy to spread and will keep indefinitely without deterioration. It may be perfumed, if desired.

The procedure for making the product herein set forth is the most simple and preferred method but some variation in temperatures and order of the steps may occur without departing from the scope of my invention.

I claim:

1. An eyebrow dressing consisting essentially of green surgical soap, beeswax, water and borax combined together in the form of a smooth, plastic, non-sticky, easily spreadable composition.

2. An eyebrow dressing consisting essentially of approximately one hundred parts by weight of green surgical soap, forty-eight parts by weight of beeswax, forty-nine parts by weight of water and three parts by weight of borax combined together in the form of a smooth, plastic, non-sticky, easily spreadable composition.

3. The method of preparing an eyebrow dressing which comprises melting green surgical soap, adding water to the soap, dissolving a small quantity of borax in water, heating the borax-water solution to about 140° F., melting beeswax, adding the borax-water solution to the melted soap, maintaining the temperature at 140° F. or over, adding the melted beeswax while stirring vigorously and allowing the product to cool.

REBECCA T. MARKIN.